(12) United States Patent
Lucas

(10) Patent No.: US 11,176,190 B2
(45) Date of Patent: Nov. 16, 2021

(54) COMPARATIVE GEOLOCATION AND GUIDANCE SYSTEM

(71) Applicant: Fisher Vance Lucas, Huntsville, AL (US)

(72) Inventor: Fisher Vance Lucas, Huntsville, AL (US)

( * ) Notice: Subject to any disclaimer, the term of this patent is extended or adjusted under 35 U.S.C. 154(b) by 0 days.

(21) Appl. No.: 16/713,208

(22) Filed: Dec. 13, 2019

(65) Prior Publication Data

US 2020/0142922 A1 May 7, 2020

Related U.S. Application Data

(63) Continuation-in-part of application No. 15/882,109, filed on Jan. 29, 2018, now Pat. No. 10,509,819, which is a continuation of application No. 14/796,688, filed on Jul. 10, 2015, now Pat. No. 9,881,028.

(60) Provisional application No. 62/022,934, filed on Jul. 10, 2014.

(51) Int. Cl.
| | |
|---|---|
| *G06F 16/51* | (2019.01) |
| *G01S 5/16* | (2006.01) |
| *G06T 7/73* | (2017.01) |
| *G06K 9/00* | (2006.01) |

(52) U.S. Cl.
CPC ............. *G06F 16/51* (2019.01); *G01S 5/16* (2013.01); *G06K 9/00671* (2013.01); *G06T 7/74* (2017.01); *G06T 2207/30244* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 2013/0325346 A1* | 12/2013 | McPeek | G01N 33/025 702/2 |
| 2016/0016646 A1* | 1/2016 | Mun | G01C 21/20 701/21 |
| 2017/0255966 A1* | 9/2017 | Khoury | H04L 67/20 |

FOREIGN PATENT DOCUMENTS

EP          2472224 A1 *   7/2012   ............. G01C 21/02

* cited by examiner

*Primary Examiner* — Edemio Navas, Jr.
(74) *Attorney, Agent, or Firm* — Ryan J. Letson; Bradley Arant Boult Cummings LLP

(57) ABSTRACT

A photo-optic comparative geolocation system for calculating the location of an object has been developed. The apparatus includes optic sensors that capture surrounding location data, an interface that maps the optic sensor data, a storage database containing prior optical and location data, a digital sextant that provides data calculated using magnetic or celestial references, a data processor that compares the mapped data to stored data and calculates current location based on the comparison analysis, and a visual display for location information.

20 Claims, 9 Drawing Sheets

COMPARATIVE GEOLOCATION AND GUIDANCE SYSTEM

CROSS-REFERENCE TO RELATED APPLICATIONS

This application claims the benefit of, and priority to, U.S. patent application Ser. No. 15/882,109, titled "Comparative Geolocation System" that was filed on Jan. 29, 2018, which claimed the benefit of, and priority to U.S. patent application Ser. No. 14/796,688, now U.S. Pat. No. 9,881,028, titled "Photo-Optic Comparative Geolocation System" that was filed on Jul. 10, 2015 which in turn claimed the benefit of, and priority to, U.S. Provisional Application No. 62/022,934 titled "Photo-Optic Comparative Geolocation System" that was filed on Jul. 10, 2014; each of the foregoing is incorporated herein by reference in its entirety.

BACKGROUND OF INVENTION

Many industries, both commercial and military in nature, utilize geolocation (i.e., location on the surface of the earth) systems for navigation, communications, and other purposes. In addition, personal use of geolocation systems has become prevalent in recent years. Typically, global positioning systems ("GPS") or other types of satellite or communications networks are used in order to calculate an exact location of the user.

Certain capabilities currently exist, but these methods of geolocation involve the transmission of signals, whether via satellite or other type of communications network. In some instances, a user may need to calculate his geolocation without the transmission of signals. For example, communication networks may be unavailable in some remote areas, making some geolocation devices or methods impossible. Alternatively, in some military applications it may be necessary for a user to avoid the transmission of any type of signals, whether satellite or otherwise, in order to avoid potential detection. Consequently, the need exists for a standalone system that is able to calculate geolocation of an object without utilizing any type of signal transmission.

SUMMARY OF THE INVENTION

In some aspects, the invention relates to a photo-optic apparatus for calculating geolocation of an object, comprising: an optic sensor that captures surrounding location data; an interface that maps the optic sensor data; a storage database containing prior optical and location data; a digital sextant that provides data calculated using magnetic or celestial references; and a data processor that compares the mapped data to stored data and calculate current location based on the comparison analysis and digital sextant data.

In other aspects, the invention relates to a photo-optic apparatus for calculating geolocation of an object, comprising: a camera for capturing surrounding image data, the camera located within an enclosure; an internal compass within the enclosure; a memory containing stored image and location data, the memory located within the enclosure; a data processor that performs automated comparison analyses of the stored data and camera data, the data processor located within the enclosure; and a screen to visually display output from the data processor.

BRIEF DESCRIPTION OF DRAWINGS

It should be noted that identical features in different drawings are shown with the same reference numeral.

DETAILED DESCRIPTION

A photo-optic comparative geolocation system has been developed. It should be understood that the present invention may be utilized in a broad range of commercial industries, including but not limited to transportation, telecommunications, and security. Additionally, the present invention may be used for personal or military purposes. The present invention provides the capability to calculate the geolocation of an object—without the need for any type of signal transmission over a network—by comparing digital map data with visually observable, optically captured reference points. Additionally, the present invention provides the capability to store various images relating to an object's geolocation, including surrounding landscape or architectural images. Features of the system include: the ability to capture surrounding image data; the ability to store image data within the system; an interface between initial image data and stored geolocation data; an internal digital sextant; a data processor; and the ability to calculate geolocation of an object based on automated and intelligent comparison of stored data with optically captured reference points in the surrounding area.

Figure 1:
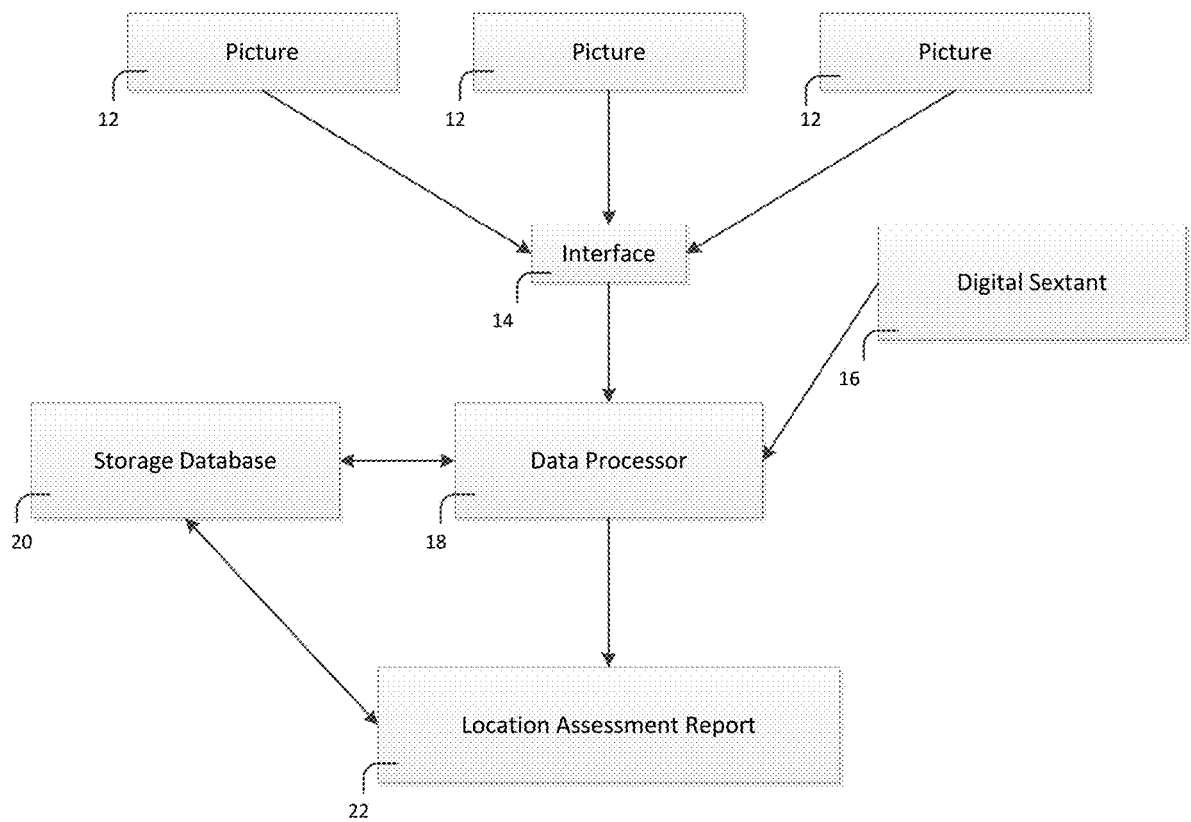
FIG. 1 shows a diagram of a photo-optic comparative geolocation system in accordance with one embodiment of the present invention.

FIG. 1 shows a diagram of a photo-optic comparative geolocation system 10 in accordance with one embodiment of the present invention. In this embodiment, at least one picture 12 is provided as input to the system 10. Although cameras are described below, it is contemplated that these pictures 12 or other types of image data may be provided through different means, such as other types of optical sensors. Each picture 12 is mapped through an interface 14, which labels or categorizes the digital image data and converts the digital image data into the format required by the data processor 18, if necessary. Once mapped by the interface 14, the image data is sent to a data processor 18, which may perform various functions, such as the creation of a compiled image or further categorization of image data. The data processor 18 also receives data from a digital sextant 16, which is more fully described below and shown in FIG. 2. Finally, the data processor 18 receives data from a storage database 20.

Generally, the data processor 18 compares image data received from the interface 14 with data received from the digital sextant 16 and/or the storage database 20. Data stored in the storage database 20 may include topographical maps, previous system 10 data, three-dimensional maps, landscape images, architectural images, known geophysical data, or other types of data. Data received from the digital sextant 16 may include location data determined from celestial objects, as further described below. In comparing current image data to the foregoing types of received or stored data, the data processor 18 may determine a geolocation by eliminating non-matching results, or by affirmatively detecting a corresponding image. Once a geolocation is determined, the data processor 18 may send analysis or assessment results to a user through a location assessment report 22. The assessment report 22 may be transmitted to the user through some type of visual display or other type of user interface.

Figure 2:
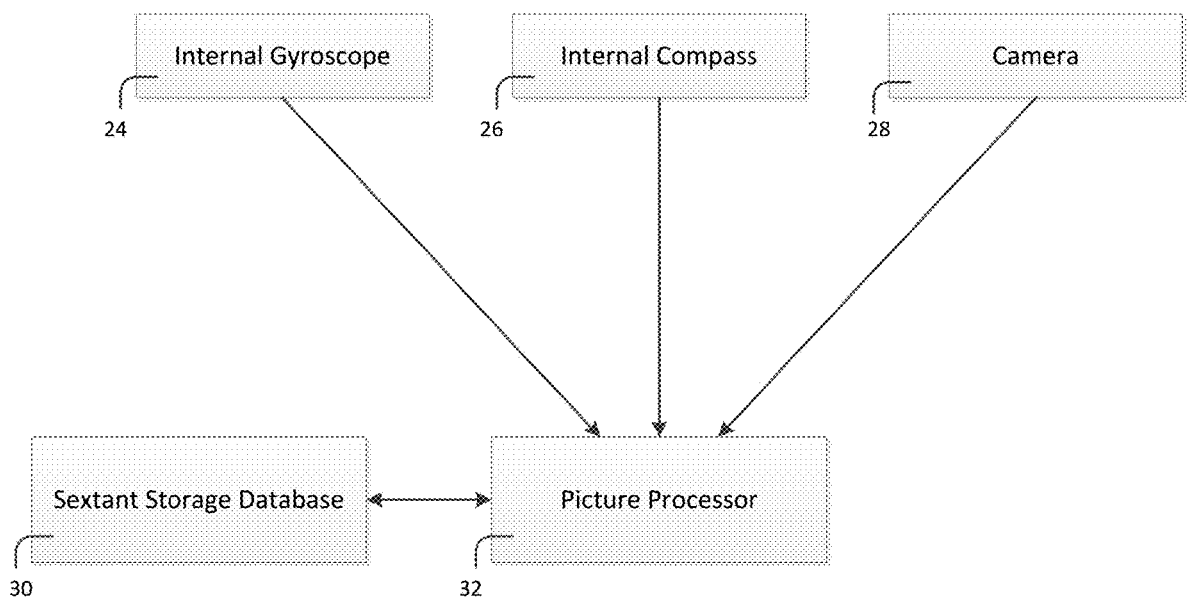
FIG. 2 shows a diagram of a digital sextant in accordance with one embodiment of the present invention.

FIG. 2 shows a diagram of a digital sextant 16, as shown in FIG. 1, in accordance with one embodiment of the present invention. In this example, the digital sextant 16 includes an internal compass 26, and an internal gyroscope 24 for stabilization. The internal gyroscope 24 may be a laser or fiber optic gyroscope, or it may be a conventional mechanical gyroscope. Additionally, the digital sextant 16 may include a camera 28 to assist with the recognition of celestial objects. A sextant storage database 30 provides the ability for the digital sextant to maintain star maps, or other types of sky maps or images as viewed from varying locations around the earth. The picture processor 32 provides the digital sextant 16 with the internal capability to compile data from each of the foregoing internal components and provide resulting location data.

Figure 3:
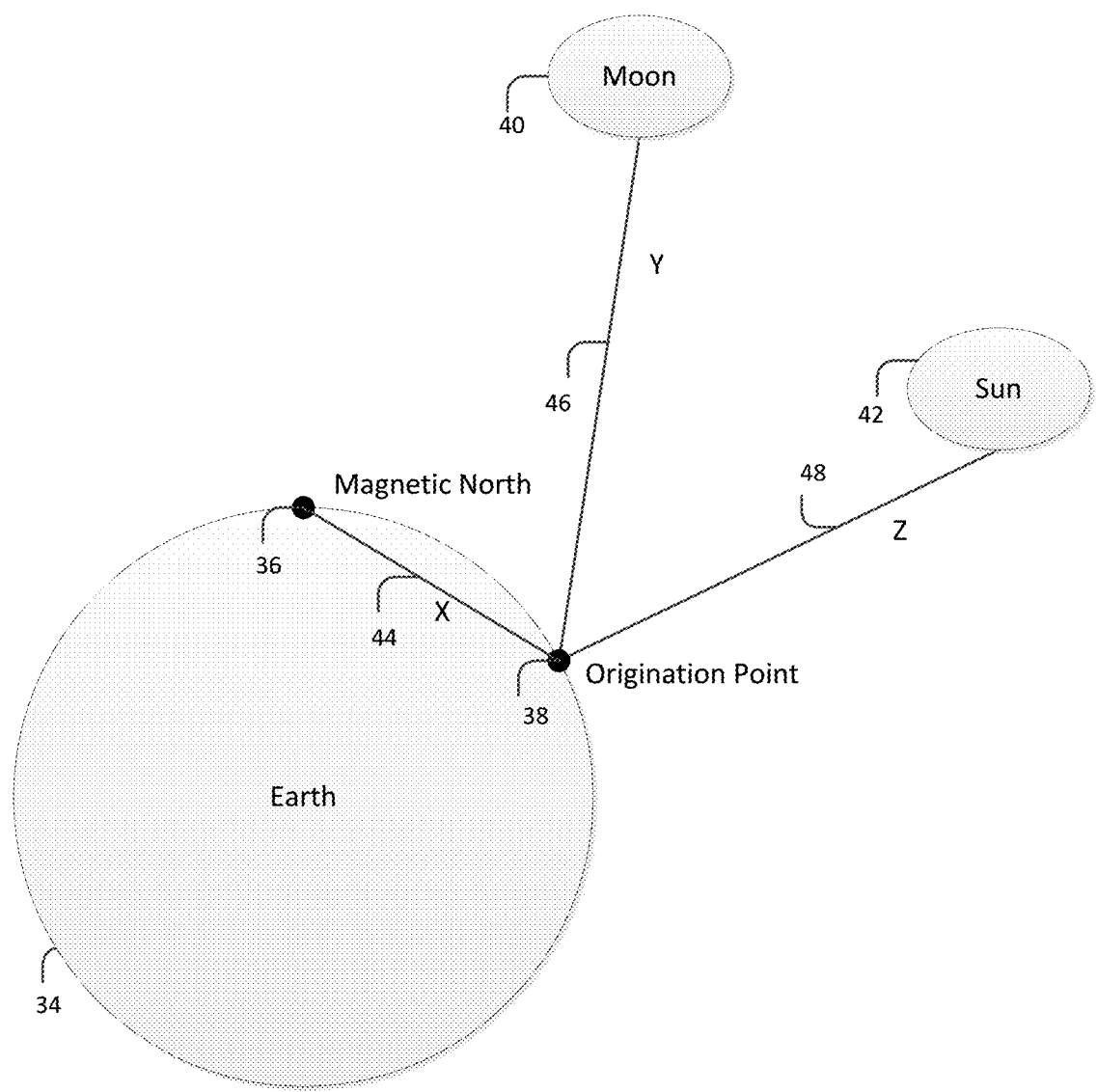
FIG. 3 shows an example of a method of geolocation calculation by a digital sextant in accordance with one embodiment of the present invention.

FIG. 3 shows an example of a method of geolocation calculation by a digital sextant 16 in accordance with one embodiment of the present invention. In this example, the digital sextant 16 requires three points of reference in order to provide a geolocation for the origination point 38. First, the digital sextant 16 may utilize an internal compass 26 to determine the user's position in relation to magnetic north 36. Next, the digital sextant 16 may calculate two more reference points using the sun 42 and moon 40 to measure angular height, resulting in lines of position from the origination point 38. Through these observations, the digital sextant 16 may determine an x-axis 44, a y-axis 46, and a z-axis 48, allowing the calculation of an approximate geolocation for the origination point 38.

Figure 4:
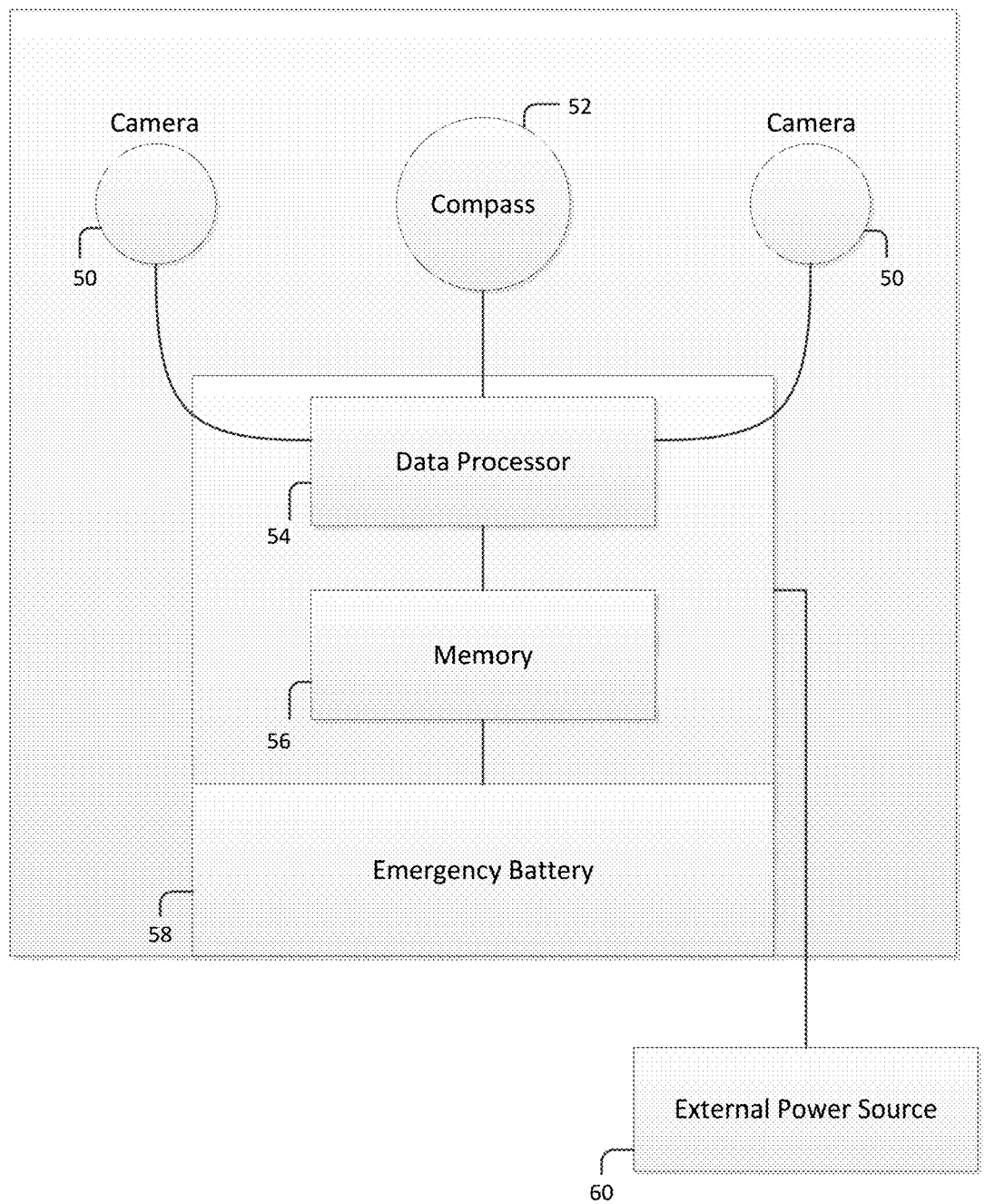
FIG. 4 shows a diagram of a photo-optic comparative geolocation system in accordance with another embodiment of the present invention.

FIG. 4 shows a diagram of a photo-optic comparative geolocation system in accordance with another embodiment of the present invention. In this embodiment, the system 10 may be mounted on a vehicle, such as an aircraft. The system may include multiple cameras 50 for different viewpoints and image data. For example, if mounted on an aircraft, one camera 50 may be mounted on the lower portion of the fuselage in order to capture surrounding images for the landscape below during flight, while another camera 50 may be mounted on the upper portion of the fuselage to provide image data for the sky. The system 10 may also include a compass 52 for additional data. In this embodiment, the system 10 includes a data processor 54 and memory 56, which provide functions similar to those described in FIG. 1 above for the data processor 18 and storage database 20. While mounted on a vehicle, the system 10 can be powered by an external power source 60, but an emergency battery 58 may be included in the event of a loss of external power.

Figure 5:
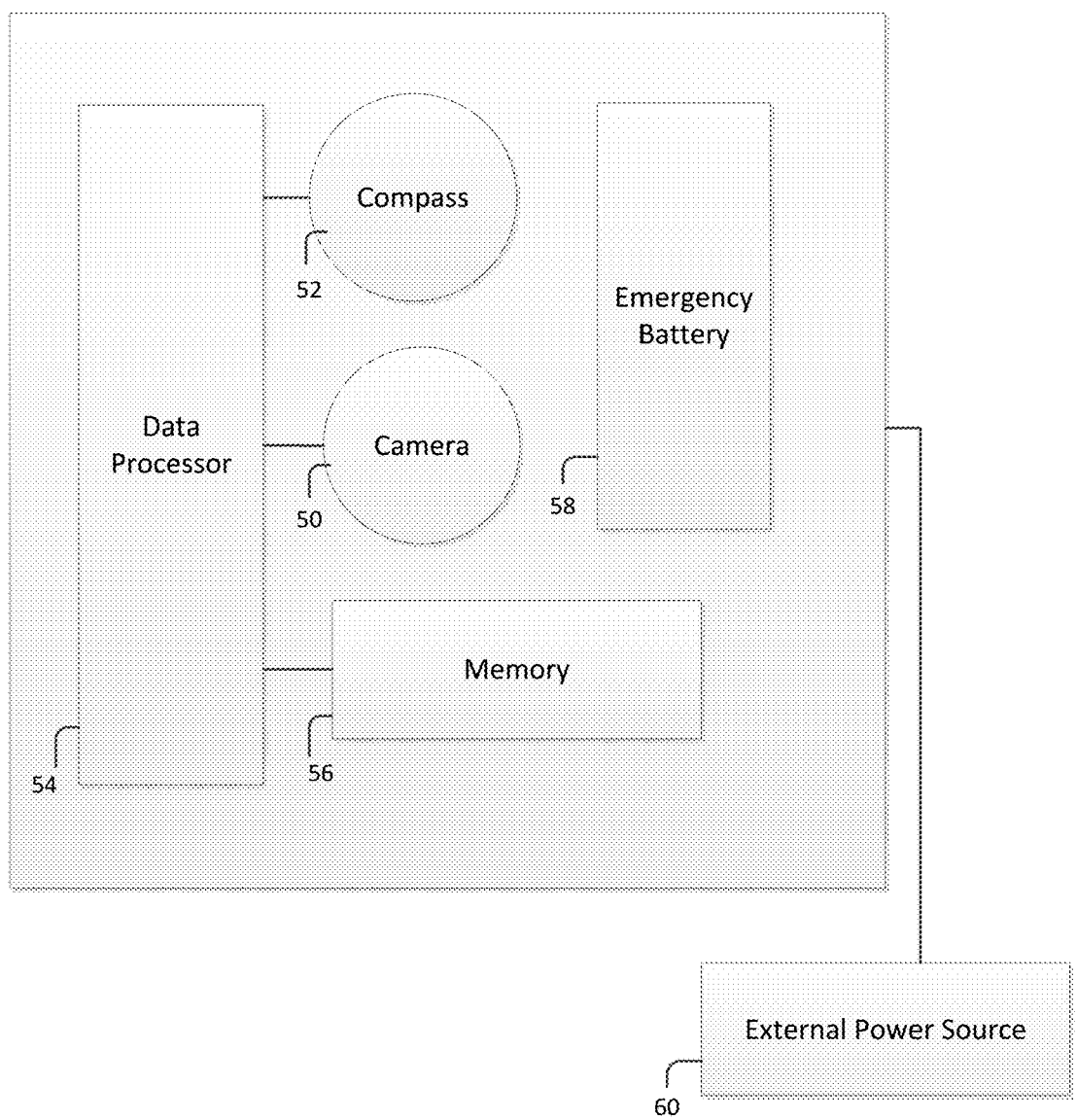
FIG. 5 shows a diagram of a photo-optic comparative geolocation system in accordance with another embodiment of the present invention.

FIG. 5 shows a diagram of a photo-optic comparative geolocation system in accordance with another embodiment of the present invention. In this embodiment, the system 10 may again be mounted on a vehicle, such as a nautical vessel. Due to varying requirements of different vehicles, only one camera 52 may be included. Although the remaining components are similar to those discussed for FIG. 4 above, the components may be configured differently to meet the needs of a certain vehicle.

Figure 6:
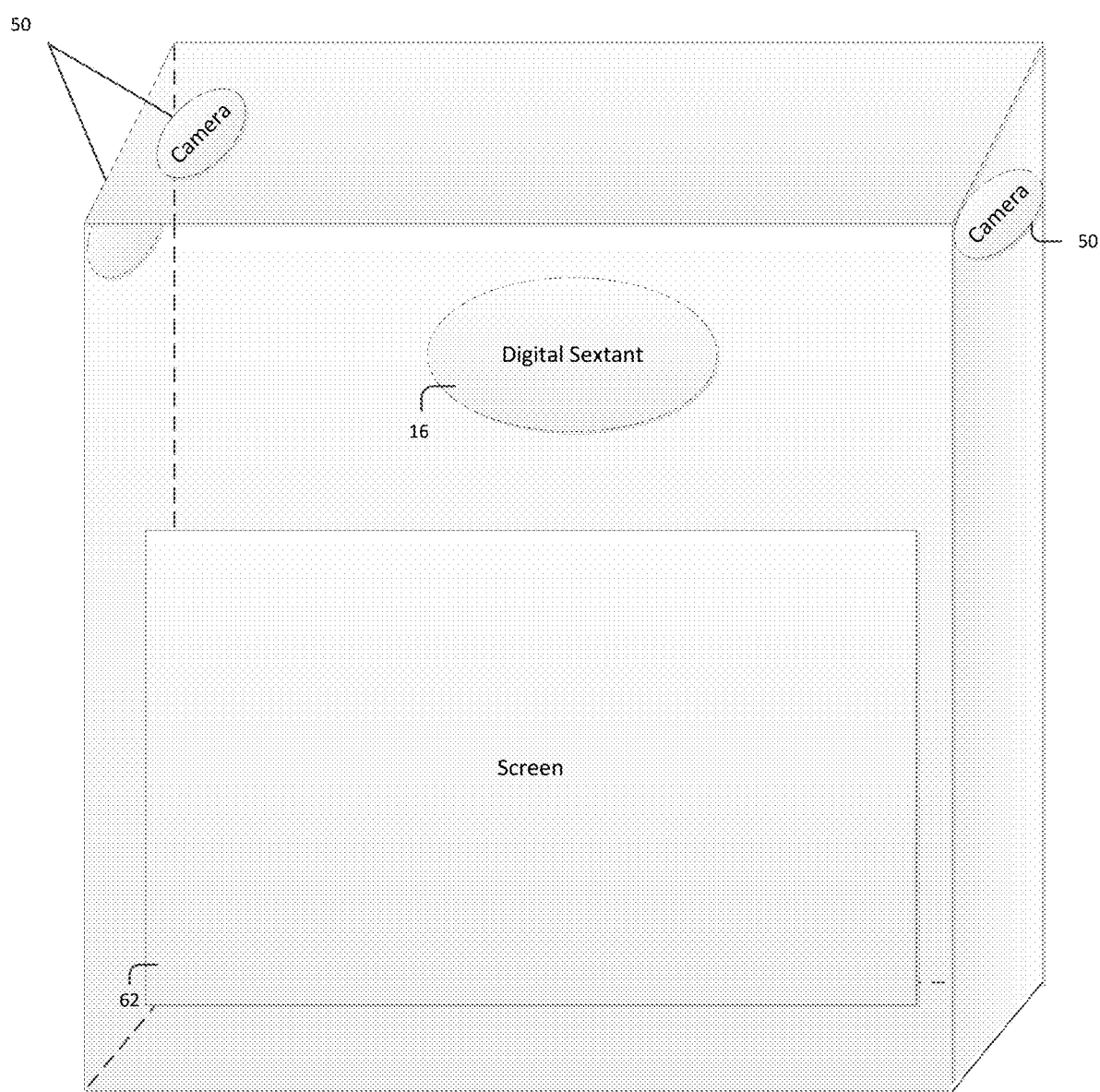
FIG. 6 shows a diagram of a handheld photo-optic comparative geolocation system in accordance with one embodiment of the present invention.

FIG. 6 shows a diagram of a handheld photo-optic comparative geolocation system in accordance with one embodiment of the present invention. In addition to mounting the system 10 on various objects, as discussed above, the system may be configured in a handheld device 64. The handheld device 64 may include a digital sextant 16, as described above. Further, the handheld device 64 may include at least one camera 50 for capturing surrounding images. Other components, such as a storage database 20 and data processor 18, may be included internally within the handheld device 64. Finally, the handheld device 64 may include a screen 62 for visual display of geolocation results. Different types of screens may be used, such as a simple digital display, a color screen capable of showing captured images, or a touch screen interface with the capability for a user to view and manipulate data.

Figure 7:
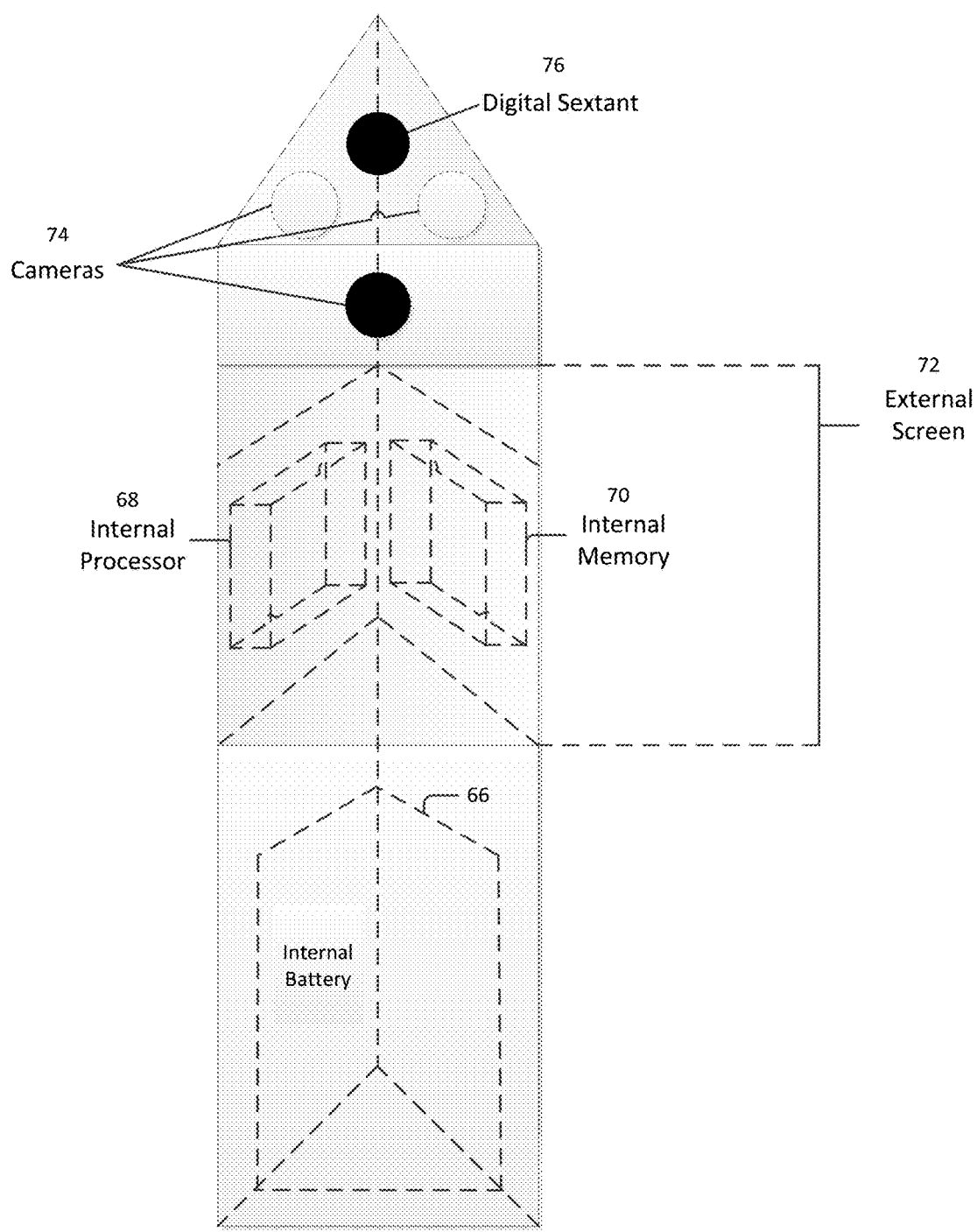
FIG. 7 shows an example of a handheld photo-optic comparative geolocation system in accordance with another embodiment of the present invention.

FIG. 7 shows an example of a handheld photo-optic comparative geolocation system in accordance with another embodiment of the present invention. In this embodiment, the handheld device 64 includes cameras 74, a digital sextant 76, and an external screen 72. The internal processor 68, internal memory 70, and internal battery 66 can all be seen within the handheld device 64. The handheld device 64 may also include additional components, such as sensors for a compass or gyroscope. It is contemplated that the handheld device 64 may include other capabilities aside from geolocation calculation. For example, the handheld device 64 may be a smartphone or other type of personal device, allowing for a more cost-effective means of implementing the present invention.

Additional features of the present invention may include the use of internal application software to allow for the intelligent and automated comparison of surrounding image data with previously stored geolocation data. Also, it is contemplated that many types of identifiers may be stored by the system and used in the system's comparisons and analyses. For example, geophysical and architectural data are described above, but the system may also use ecological data such as native plants or animals in order to visually recognize surroundings and eliminate certain potential regions or areas.

Although the medium in which the system can be used has been described in a limited manner, the present invention may be implemented using a variety of means. As depicted in the exemplary embodiments, the present invention may be implemented by a microprocessor or the internet. Moreover, the system may be carried out through a computer network, used within other types of data-exchange media or protocols, or performed on multithreaded applications. The volume of information processed, combined with the speed at which the information must be processed, makes the use of a computer advantageous. The computer system will typically have a processor, such as central processing unit (CPU), where the processor is linked to a memory, an input, and an output. A computer or computer network may include several other components as well. For example, the memory components may include a hard disc for non-transitory storage of information, as well as random access memory (RAM). The input components may include a keyboard, a touchscreen, a mouse, and a modem for electronic communication with other devices. The output components may include a modem, which may be the same modem used for the input or a different one, as well as a monitor or speakers. Many of the different components may have varying physical locations, but they are still considered a computer or computer network for purposes of this description. For example, the memory may be on a hard drive in the same physical device as the processor, or the memory component may be remotely located and accessed as needed using the input and output. The memory may also have one more programs to carry out the functions described previously. The memory components may also have one or more databases along with related data.

In summary, the present invention of a photo-optic comparative geolocation system has at least the following advantages:
  providing the standalone capability to determine geolocation of an object without the need for signal transmission of any type;
  providing the capability to determine geolocation without outside detection, avoiding the need to jam tracking signals or take other types of precautionary measures;
  providing the automated capability to intelligently compare stored data with optically captured data of surrounding environment in order to determine geolocation;
  providing the cost-effective capability to adapt existing technology, such as a smartphone, to perform the functions of photo-optic comparative geolocation;
  providing the capability to calculate geolocation without the need to subscribe to satellite, cellular, or other wireless or radio-based services; and
  providing the capability to calculate geolocation in a live manner, without delays typically associated with weak signals or other types of communication delays.

In some embodiments, a comparative geolocation system 10 can be adapted for use in unmanned systems, such as unmanned aircraft, unmanned vehicles, unmanned nautical vessels. An unmanned system may use geolocation information for a variety of purposes, such as guidance and navigation, environmental monitoring, surveying, geotagging, etc. In this regard, the unmanned system may have hardware and software to implement a comparative geolocation system similar to the system 10 described above in order to identify desired geolocations.

Figure 8:
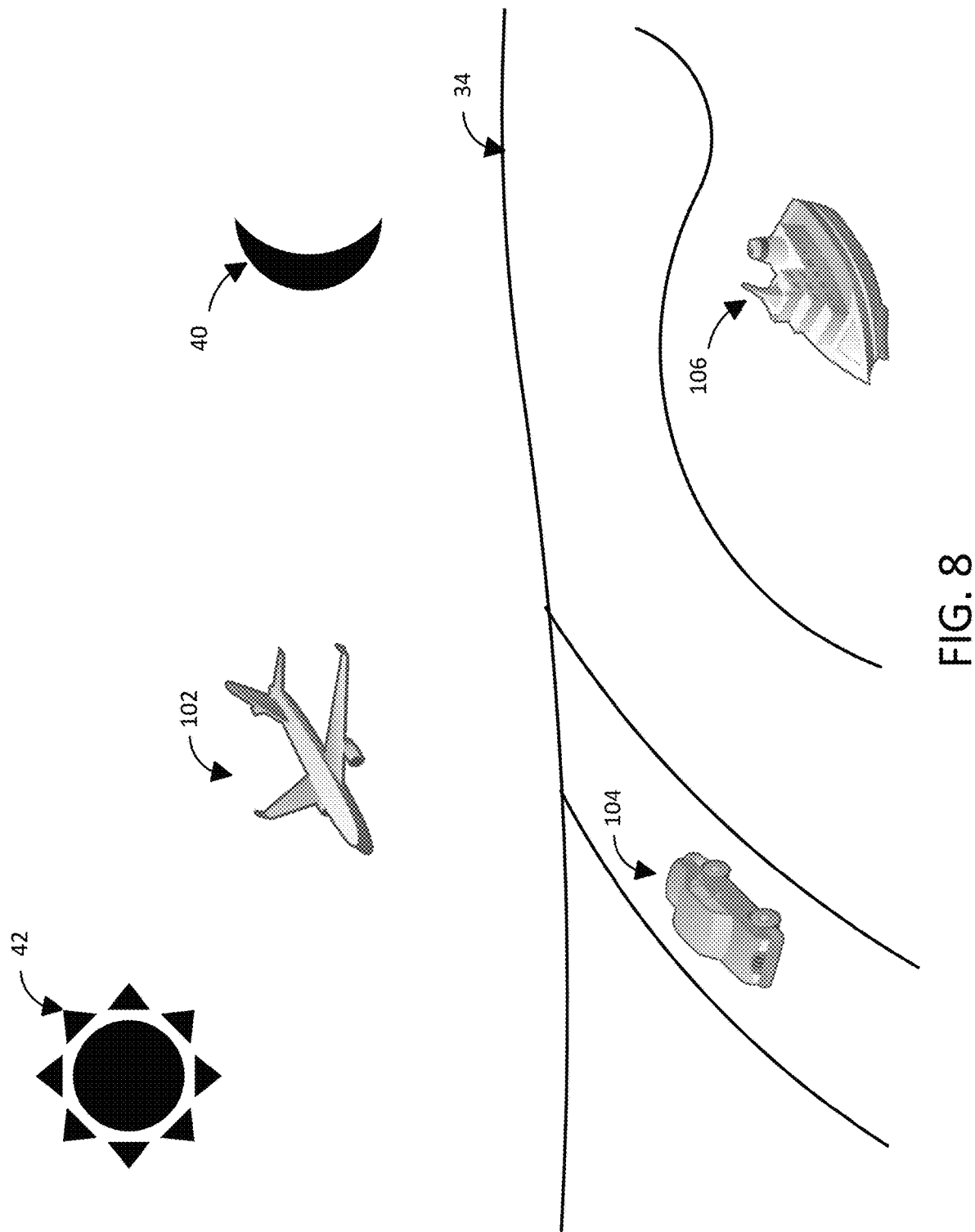
FIG. 8 shows comparative geolocation and guidance system in accordance with some embodiments of the present disclosure.

FIG. 8 shows exemplary implementations of such a comparative geolocation system implemented in various unmanned systems in accordance with some embodiments of the present disclosure. The systems of FIG. 8 include exemplary embodiments of an unmanned aircraft 102, unmanned vehicle 104 and unmanned vessel 106. Other types of unmanned systems, such as satellites, balloons, spacecraft, projectiles (e.g., rockets, missiles, etc.) or other unmanned systems are possible.

Although FIG. 8 depicts a single unmanned aircraft 102, unmanned vehicle 104 and unmanned vessel 106, the comparative geolocation techniques and functionality ascribed to the controller 110 herein may be implemented in various types of systems for which guidance may be required. In addition, even though the aircraft 102, vehicle 104 and vessel 106 are described as being unmanned, it will be understood that the techniques described herein may be implemented in other types of systems (e.g., manned, remote control, etc.) in some embodiments.

Unmanned aircraft 102 can be various types of aircraft, such as an airplane, helicopter, drone or other system configured for flight operations. A single aircraft 102 is show in FIG. 8, but in some embodiments, various numbers of aircraft are possible. In some embodiments, the unmanned aircraft 102 may be a military aircraft such as a fighter, helicopter, tanker, bomber, transport, drone, or other type of military aircraft. Any of the foregoing may be configured to operate autonomously or via remote-control from a user. Other types of unmanned aircraft are possible in other embodiments.

Unmanned vehicle 104 is depicted as a ear, but can be various types and numbers of land-based motorized vehicles, such as a truck, bus, van, tractor, motorcycle, etc. In some embodiments, the unmanned vehicle 104 may be a military vehicle such as a tank, armored personnel carrier, or other type of military vehicle. Any of the foregoing may be configured to operate autonomously or via remote-control from a user. Other types of unmanned vehicles are possible in other embodiments.

Unmanned vessel 106 can be various types of vessels and other types of surface watercraft, including a ship, boat, catamaran, personal watercraft or other type of watercraft. In some embodiments, the vessel 106 can be submersible (e.g., submarines), and can be configured for operation in various combinations of surface and underwater use. Any of the foregoing may be configured to operate autonomously or via remote-control from a user. Other types of unmanned vessels are possible in other embodiments.

Figure 9:
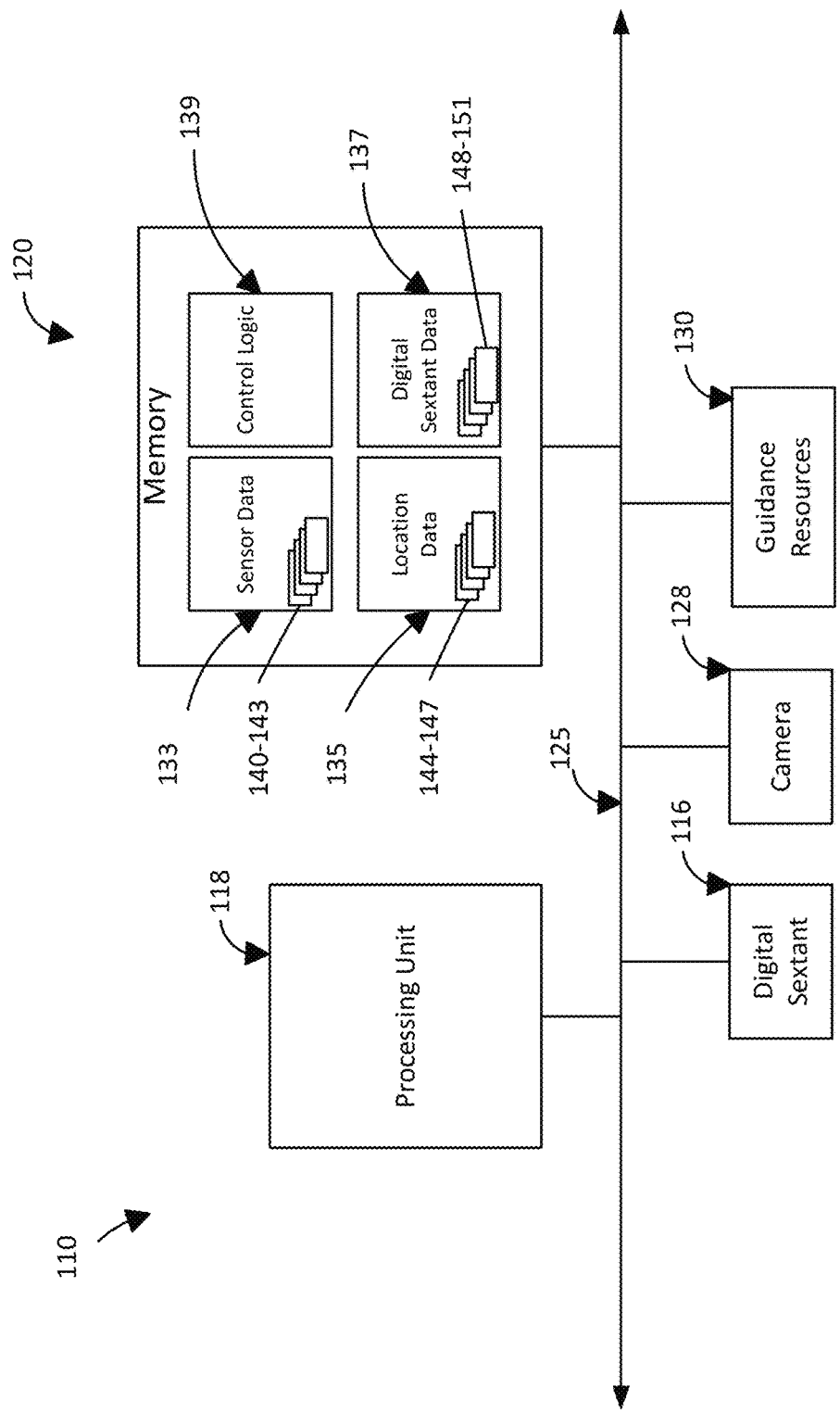
FIG. 9 is a block diagram of a comparative geolocation and guidance system in accordance with some embodiments of the present disclosure.

FIG. 9 is a block diagram of a controller 110 in accordance with some embodiments of the present disclosure. Each of the unmanned aircraft 102, unmanned vehicle 104 and unmanned vessel 106 shown in FIG. 8 may include a controller 110 configured to perform substantially the same operation as the controller 110 of FIG. 9. The controller 110 of FIG. 9 includes a processing unit 118, a digital sextant 116, and camera 128, although other components are possible in other embodiments. The controller 110 also includes at least one memory 120 which stores sensor data 133, location data 135, digital sextant data 137 and control logic 139.

The exemplary controller 110 depicted by FIG. 9 includes at least one conventional processing unit 118, which includes processing hardware for executing instructions stored in memory 120. As an example, the processing unit 118 may include a central processing unit (CPU) or a digital signal processor (DSP). The processing unit 118 is configured to communicate with and drive the other elements within the controller 110 via a local interface 125, which can include at least one bus. In addition, the controller 110 can include various communications and output interfaces (e.g., screens, displays, etc.), which are not specifically shown in FIG. 9, but can be included to allow the unmanned system to perform functionality described herein, such as to provide an assessment report 22 or other information to a user. In one embodiment, the controller 110 is coupled communicatively to the camera 128 and guidance resources 130, for example, via conductive means or via short-range communication protocol, such as Bluetooth®.

The digital sextant 116 may be configured to perform similar functionality and operation as the digital sextant described above (e.g., with regard to FIGS. 2 and 6), and can include an internal compass, and an internal gyroscope, a dedicated camera, or other components to achieve the functionality described herein.

Camera 128 include one or more cameras, and can be various devices configured to capture images of the environment surrounding the system 110. The camera 128 may comprise one or more dedicated cameras (e.g., for digital sextant 116), as well as cameras configured to sense particular types of images. In some embodiments, the camera 128 may be configured to capture visible light, non-visible light or combinations thereof. In some embodiments, the camera 128 may be configured to capture combinations of different types of energy/light/radiation, etc., such as x-ray, gamma ray, or other types of energy or waves. For example, a camera 128 may have additional components and may be configured to perform thermal imaging, although light sensors (e.g., optical scanners, infrared, etc.), sound sensors (e.g., microphones, acoustic receivers, etc.), or other sensor types may be possible. Further, the camera 128 can be configured as an active or passive camera, and data from the camera 128 may be stored as sensor data 133, described further below.

The controller 110 may be configured to communicate geolocation and guidance information with various guidance resources 130, as noted above. Guidance resources 130 can include various components capable of performing or facilitating guidance of one or more systems associated with controller 110 or otherwise using geolocation information determined by the controller 110 (e.g., logic 139) for guidance purposes. In some embodiments, the guidance resources 130 can include navigational components, such as all or a portion of one or more propulsion systems (e.g., powerplants, batteries, engines, propellers, drive shafts, etc.) or control/navigation/avionics systems (e.g., control surfaces, steering subsystems, etc.). As described further below, based on guidance instructions included in control logic 139, the controller 110 may provide control signals to aid in operation of the one or more guidance resources 130.

The memory 120 comprises sensor data 133, which can include information (e.g., image data) received from sensors (e.g., camera 128) to which the controller 110 is coupled. In some embodiments, the sensor data 133 can include data indicative of essentially any discernible or detectable aspects of a physical environment within which the system 10 is located. In an embodiment, the data 133 includes data from the camera 128 indicating visible and non-visible aspects of the surrounding environment. Information stored in sensor data 133 may be stored as one or more sensor data records 140-143, which can include various types of information and can be grouped according to various categories of information (e.g., location, feature type, etc.). The sensor data 133 can include data used to map pictures 12 through the interface 14 as described above, such as the pictures 12 and associated image data. The sensor data 133 can include other data from other sources in other embodiments.

The memory 120 also comprises location data 135, which can include previously gathered data indicative of essentially any discernible or detectable aspects of a physical environment within which the system 10 is located, as well as information received from the digital sextant 116, and data similar to the data described above as being stored in storage database 20 and memory 56 in some embodiments (e.g., topographical maps, previous system data, three-dimensional maps, landscape images, architectural images, known geophysical data, underwater environmental maps and details etc.). In addition, the location data 135 can include information about species or types of life forms, such as animals, fauna, etc., that are present in various environments where the unmanned system may be operating and use such information to aid in identifying the desired geolocation. The location data can include prior non-visible data, visible data, and information regarding the physical environment in which the system associated with controller 110 is located (e.g., its surroundings). Information stored in location data 135 may be stored as one or more location data records 144-147, which can include various types of information and can be grouped according to various categories of information (e.g., location, feature type, etc.). The location data 135 can include other types of data in other embodiments.

Memory 120 further comprises digital sextant data 137, which may include information similar to that stored in storage database 30 and memory 56 above, such as astronomical data, maps, or other types of information indicative of aspects or details associated with reference points that can be used to perform orientation and geolocation determinations. The sextant data 137 further can include information and measurements related to orientation, such as gyroscopic information, compass information, or other similar information. Information stored in sextant data 137 may be stored as one or more sextant data records 148-151, which can include various types of information and can be grouped according to various categories of information (e.g., location, feature type, etc.). Other types of information may be stored in sextant data 137 in other embodiments.

Memory 120 also includes control logic 139 for generally controlling the operation of the controller 110. The control logic 139 can be implemented in software, hardware, firmware, or any combination thereof. In the exemplary controller 110 illustrated by FIG. 9, the control logic 110 is implemented in software and stored in memory 120 of the controller 110. Note that the control logic 139, when implemented in software, can be stored and transported on any computer-readable medium for use by or in connection with an instruction execution apparatus that can fetch and execute instructions.

In an exemplary embodiment, control logic 139 can be configured to perform all, part, or desired combinations of the functionality ascribed herein to the system 10, controller 110, their components (e.g., digital sextant 116, camera 128, guidance resources 130, etc.), the devices and components described in FIGS. 1-7, and various combinations thereof. Despite the various possible combinations described above, the logic 139 may be configured to determine the one or more desired geolocations of one or more point of interest using any or various combinations of the techniques implemented by system 10 and described herein, all without the need for transmission of any type of signal over a network or use of other types of communication protocol.

As described above, the logic 139 may use information from sensor data 133, location data 135, or digital sextant data 137 to determine one or more desired geolocations. As an example operation of the logic 139, the logic 139 may compare current image data (e.g., from sensor data 133) to received or stored data (e.g., stored in location data 135), to determine the one or more desired geolocations (e.g., by eliminating non-matching results, or by affirmatively detecting a corresponding image). In some embodiments, positions of the sun 42, moon 40 and earth's surface 34 to determine a geolocation of origination point 38 (not specifically shown in FIG. 8). In an embodiment, the origination point 38 may be a location where the controller 110 itself is located (e.g., the location of a vehicle/aircraft/vessel on which the controller 110 is installed) or other point of interest.

In an additional example, the logic 139 may compare a sensor data record 140 from sensor data 133 with one or both of a location record 144 stored in location data 135 or a digital sextant record 148 stored in digital sextant data 137.

In this example, the sensor data record 140 may be indicative of an image of the environment in which the unmanned system is located, includes data indicative of one or more visible geographical features sufficient to permit identification of the feature. The logic 139 may compare information indicative of the one or more visible geographical features with information about visible features from one or both of the location record 144 and the digital sextant record 148. The logic 139 may perform a comparison (e.g., a piece-wise comparison, iterative comparison, or otherwise) between such aspects, eliminating non-matching information results identified through the comparison. If the logic 139 identifies a number of non-matching information that exceeds a threshold (e.g., a confidence threshold), the logic 139 determine that the information in the location record 144 or the digital sextant record 148 does not match the location associated with the sensor data record 140 and may retrieve one or more additional location data records (e.g., 145-147) or digital sextant data records (149-151) until a number of non-matching information does not exceed the threshold. Once the logic 139 determines that a match between the sensor data records 140 and one or both of a location record 144 or digital sextant record 148 exists, the logic 139 may determine that the geolocation associated with the sensor data records 140 corresponds with the geolocation associated with location record 144 or digital sextant record 148, the logic 139 may note the corresponding geolocation and identify the geolocation as the determined geolocation. The logic 139 may then provide the determined geolocation for use as described herein above and below.

Once a geolocation for one or more points of interest is determined, the logic 139 can use the determined geolocation for various purposes. The control logic 139 may provide the determined geolocation for use by other resources (e.g., guidance resources 130) or to allow the controller 110 to perform guidance operations. Guidance can be of the unmanned system associated with controller 110 itself or of one or more additional unmanned systems with which the unmanned system is associated or is in communication. In one embodiment, the controller 110 may be configured to control a single unmanned system, but in some embodiments, the controller 110 may be in communication with one or more additional controllers of one or more other unmanned systems (e.g., another vehicle, aircraft, vessel, projectile, etc.), and may provide one or more of geolocation information and guidance instructions to the other unmanned systems. Further, the logic 139 can further provide determined geolocation information to a user, and the user can use the determined geolocation information as desired for navigational purposes, guidance purposes or other desired uses.

In some embodiments, the logic 139 can be implemented in one or more autonomous systems, and may comprise instructions implementing an autonomous guidance application. For example, in some embodiments, the aircraft 102, vehicle 104 and vessel 106 may be configured to operate autonomously, capable of performing operation successfully independent of any need for human intervention. In this regard, the logic 139 may comprise instructions configured to allow the controller 110 to perform autonomous control, operation and guidance of aircraft 102, vehicle 104 and vessel 106. The logic 139 may be configured to control operation and navigation of the autonomous system using various techniques, such as by providing control signals to components of the autonomous system. In addition, in some embodiments, the logic 139 can be configured for autonomous operation of other examples of unmanned systems, such as systems operating via remote control or semi-autonomous operations.

While the invention has been described with respect to a limited number of embodiments, those skilled in the art, having benefit of this disclosure, will appreciate that other embodiments can be devised which do not depart from the scope of the invention as disclosed here.

What is claimed is:

1. A comparative geolocation guidance system, comprising:
   a non-visible spectrum sensor that captures non-visible location data regarding the system's geophysical surroundings;
   an interface that maps the sensor data;
   a digital sextant that provides digital sextant data calculated using magnetic or celestial references;
   memory configured to store the non-visible location data, mapped data, the digital sextant data and guidance instructions; and
   at least one processor configured to execute the guidance instructions to perform operations comprising:
      comparing the mapped data to stored data;
      calculating a current location based on the comparing and the digital sextant data, wherein the calculating occurs without receiving a navigation or positioning signal external to the system, and
      wherein the calculating comprises identification of a feature of the system's geophysical surroundings; and
      controlling a resource of the guidance system based on the current location.

2. The system of claim 1, wherein comparative geolocation guidance system is implemented in an unmanned system.

3. The system of claim 2, wherein the unmanned system is autonomous.

4. The system of claim 2, wherein the unmanned system is remotely controlled.

5. The system of claim 2, wherein the unmanned system comprises an aircraft.

6. The system of claim 2, wherein the unmanned system comprises a land vehicle.

7. The system of claim 2, wherein the unmanned system comprises a nautical vessel.

8. The system of claim 7, wherein the nautical vessel is submersible.

9. A spectral comparative geolocation guidance system, comprising:
   a sensor for capturing surrounding non visual visible geophysical data, the sensor located within an enclosure,
   an internal compass within the enclosure;
   a memory containing stored location data and guidance instructions, the memory located within the enclosure;
   at least one processor configured to execute the guidance instructions to perform operations comprising:
      comparing the stored data and sensor data;
      calculating a current location based on the comparing, wherein the calculating occurs without receiving a navigation or positioning signal external to the system, and
      wherein the calculating comprises identification of a feature of the system's geophysical surroundings; and
      controlling a resource of the guidance system based on the current location.

10. The system of claim 9, wherein comparative geolocation guidance system is implemented in an unmanned system.

11. The system of claim 10, wherein the unmanned system is autonomous.

12. The system of claim 10, wherein the unmanned system is remotely controlled.

13. The system of claim 10, wherein the unmanned system comprises an aircraft.

14. The system of claim 10, wherein the unmanned system comprises a land vehicle.

15. The system of claim 10, wherein the unmanned system comprises a nautical vessel.

16. The system of claim 15, wherein the nautical vessel comprises submersible.

17. A method for comparative geolocation guidance, comprising:
   capturing, via a non-visible spectrum sensor, non-visible location data regarding geophysical surroundings of a comparative geolocation guidance system;
   mapping, at an interface, sensor data; providing, from a digital sextant, digital sextant data calculated using magnetic or celestial references;
   storing, in memory, the non-visible location data, mapped data, the digital sextant data and guidance instructions; and
   performing, via at least one processor configured to execute the guidance instructions, operations comprising:
      comparing the mapped data to stored data;
      calculating a current location based on the comparing and the digital sextant data, wherein the calculating occurs without receiving a navigation or positioning signal external to the system, and
      wherein the calculating comprises identification of a feature of the system's geophysical surroundings; and
      controlling a resource of the guidance system based on the current location.

18. The system of claim 17, wherein comparative geolocation guidance system is implemented in an unmanned system.

19. The system of claim 18, wherein the unmanned system is autonomous.

20. The system of claim 18, wherein the unmanned system comprises an aircraft.

* * * * *